(12) United States Patent
Kessler et al.

(10) Patent No.: US 8,807,496 B2
(45) Date of Patent: Aug. 19, 2014

(54) CAMERA MOUNT

(75) Inventors: Eric Kessler, Bremen, IN (US); Richard Egglnk, Granger, IN (US)

(73) Assignee: Kessler Crane, Inc., Plymouth, IN (US)

( * ) Notice: Subject to any disclaimer, the term of this patent is extended or adjusted under 35 U.S.C. 154(b) by 304 days.

(21) Appl. No.: 13/316,059

(22) Filed: Dec. 9, 2011

(65) Prior Publication Data
US 2013/0256484 A1 Oct. 3, 2013

(51) Int. Cl.
*F16M 11/04* (2006.01)
*G03B 17/00* (2006.01)

(52) U.S. Cl.
USPC ............... 248/187.1; 248/224.7; 248/222.13; 248/224.51; 248/346.06; 396/428

(58) Field of Classification Search
CPC ........... F41G 11/003; F16M 2200/028; F16M 11/16; F16M 11/041; F16M 11/048; F16M 13/00; G03B 17/56
USPC ................................ 248/187.1; 396/419, 428
See application file for complete search history.

(56) References Cited

U.S. PATENT DOCUMENTS

| | | | | |
|---|---|---|---|---|
| 2,756,956 A | * | 7/1956 | Anderson | 248/178.1 |
| 3,612,462 A | * | 10/1971 | Mooney et al. | 248/316.4 |
| 4,979,709 A | * | 12/1990 | Ishikawa | 248/187.1 |
| 5,429,332 A | * | 7/1995 | Ishikawa | 248/187.1 |
| 6,196,504 B1 | * | 3/2001 | Lemke | 248/187.1 |
| 6,827,319 B2 | * | 12/2004 | Mayr | 248/187.1 |
| 6,994,504 B2 | | 2/2006 | Gordon | |
| 7,185,862 B1 | * | 3/2007 | Yang | 248/187.1 |
| 7,222,451 B2 | * | 5/2007 | Keng et al. | 42/94 |
| 7,823,316 B2 | * | 11/2010 | Storch et al. | 42/90 |
| 8,025,455 B2 | | 9/2011 | Huang et al. | |
| 8,256,726 B2 | * | 9/2012 | Bordignon | 248/187.1 |
| 8,567,105 B1 | * | 10/2013 | Bobro | 42/90 |
| 8,578,647 B2 | * | 11/2013 | Storch et al. | 42/124 |
| 2003/0218108 A1 | * | 11/2003 | Werner | 248/187.1 |
| 2006/0117636 A1 | * | 6/2006 | Newhall et al. | 42/124 |
| 2011/0167703 A1 | | 7/2011 | Deros | |
| 2011/0198464 A1 | | 8/2011 | Hoge | |

FOREIGN PATENT DOCUMENTS

KR 10-2007-0078460 8/2007

* cited by examiner

*Primary Examiner* — Jonathan Liu
*Assistant Examiner* — Chiedu Chibogu
(74) *Attorney, Agent, or Firm* — Botkin & Hall, LLP

(57) ABSTRACT

A mount having a plate with a tail portion and a base with a socket portion. The socket includes a dropping gate which recedes into a compartment in the base when the plate is vertically inserted on the base. The base includes a stop which engages a catch on the plate to prevent the plate from being laterally removed from the base.

7 Claims, 12 Drawing Sheets

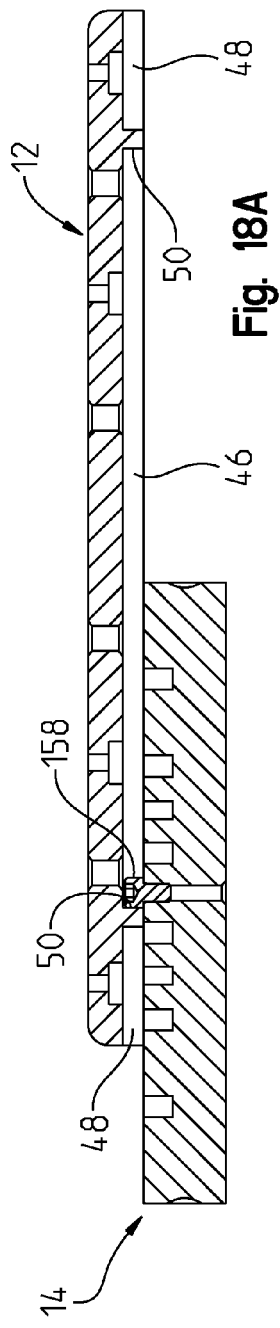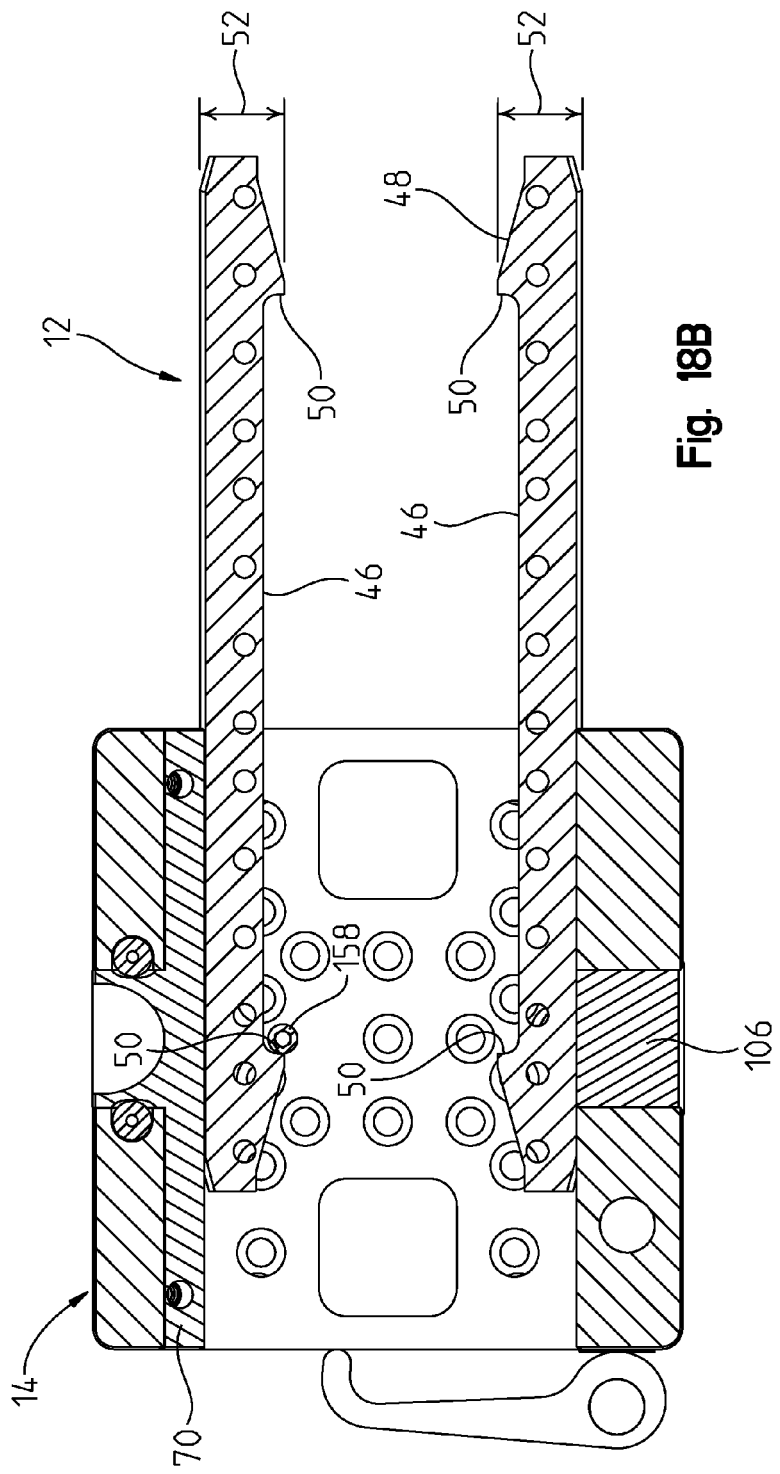

CAMERA MOUNT

BACKGROUND OF THE INVENTION

Photographic and video cameras, and related accessories, are often mounted to objects or stands, such as tripods, cranes and other camera-carrying objects. Many quick-release mounts are available for readily attaching and detaching a camera from a stand and typically include a plate/base pair where the plate is attachable to a camera body and the base is attachable to a stand and the plate and base feature connective members which readily attach and detach from one another.

Most quick-release mounting plates include a dovetailed tail which slides into a dovetailed socket on the base. Generally, the plate is inserted onto the base by sliding the dovetailed tail of the plate into one side of the dovetailed socket on the base, then sliding the plate along the socket to a desired position where it is then clamped in place with a clamping apparatus. Inserting the plate on the base in this manner can be referred to as "lateral insertion." The clamping apparatus serves to restrict the plate from sliding relative to the base when in the locked position.

Modern cameras may include many accessories which extend in various directions from the camera body, such as over-sized lenses, flash bulbs, and the like. In some cases, such accessories hang below the quick-release plate, which can make lateral insertion cumbersome since such accessories may have to be removed before the plate can be seated on the base. Further, such accessories can be damaged if a user inadvertently tries to install or remove the quick-release plate from the base with an accessory overhanging the plate.

An improved quick-release camera mount is needed which overcomes these and other failings of the prior art.

SUMMARY OF THE INVENTION

The present disclosure describes a quick-release camera mount which includes a plate which mounts on a base. The plate includes a pair of dovetailed legs which mate with a dovetailed socket formed in the base, resembling a sliding dovetail joint. One side of the socket is formed from a dropping gate such that the plate can be inserted onto the base in a direction perpendicular to a plane defined by the socket. Inserting the plate on the base in this manner can be referred to as "vertical insertion." As the plate is inserted onto the base, the dropping gate recedes into a compartment which effectively widens the point of entry of the socket, allowing the dovetailed legs to be inserted into the socket. Once the plate is fully inserted, the dropping gate springs up from the compartment and overlies one of the dovetailed legs of the plate, thereby restricting removal of the plate from the base. With the plate seated on the base the plate is slideable along a path parallel with a plane defined by the socket. The base includes a clamping apparatus used to restrict movement of the plate on the base. A stop extends from the base which prevents the plate from sliding off of the base.

BRIEF DESCRIPTION OF THE DRAWINGS

A preferred embodiment of this invention has been chosen wherein:

FIG. 18A is a cross-sectional side view of the plate seated on the base with the catch abutting the stop;
and
FIG. 18B is a cross-sectional top view of the plate seated on the base with the catch abutting the stop.

DESCRIPTION OF THE PREFERRED EMBODIMENT

Figure 1:
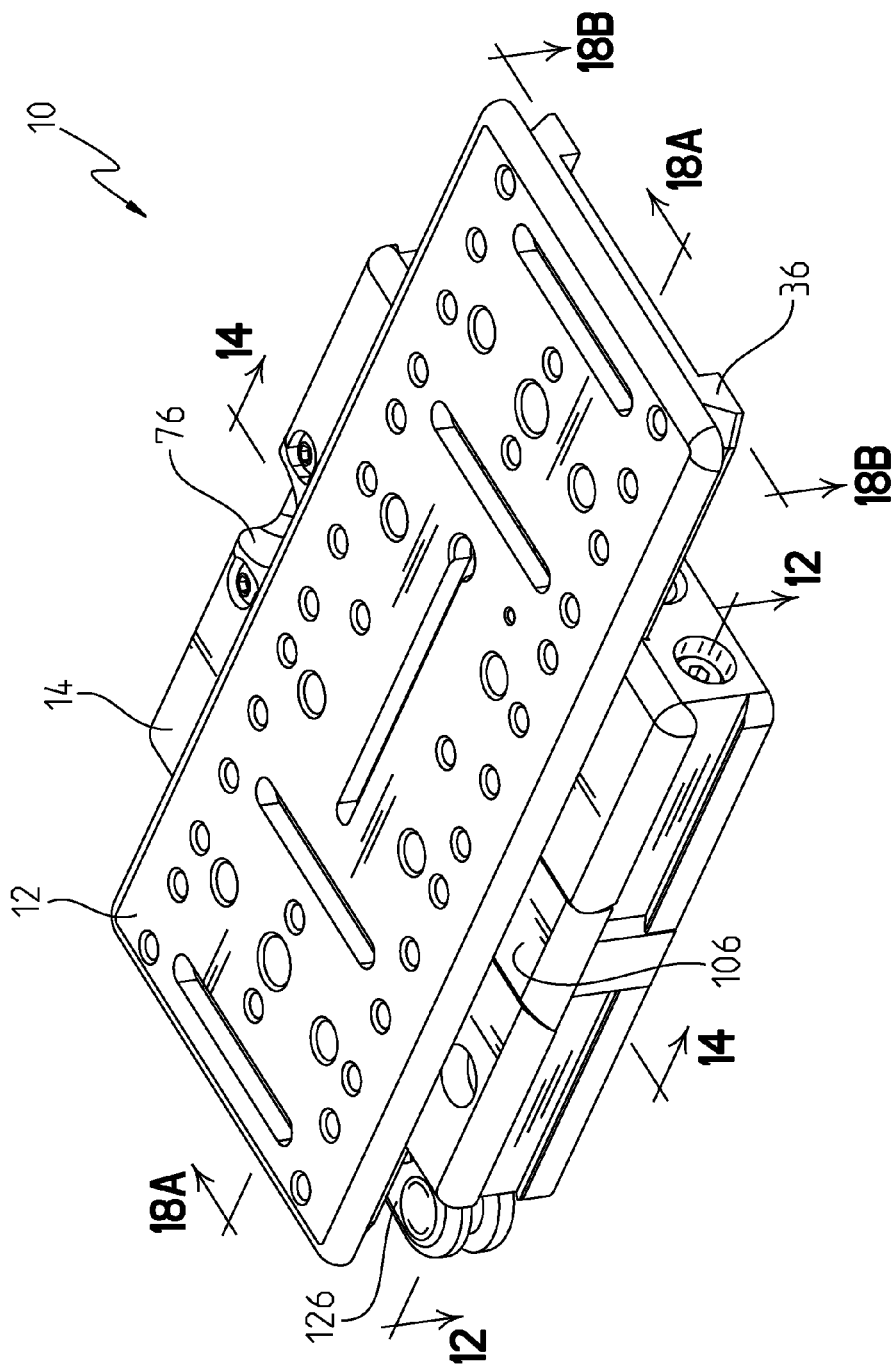
FIG. 1 is a perspective view of the plate seated on the base.

Mounting system 10 includes two main elements: a plate 12 and a base 14. Plate 12 includes a tail 36 and base 14 includes a socket 18; tail 36 and socket 18 mate together in a dovetailed-fashion to removably secure plate 12 on base 14 as shown in FIG. 1. These and other aspects of mounting system 10 will be described in detail as follows.

Mounting system 10 is described herein as used to mount a camera to a stand, but it is contemplated that the mounting system of the present disclosure has other applications. One example of a suitable alternative application is to use mounting system 10 to removably mount seats to a boat. As such, any reference herein to cameras should not be read as limiting the scope of the present disclosure.

Figure 2:
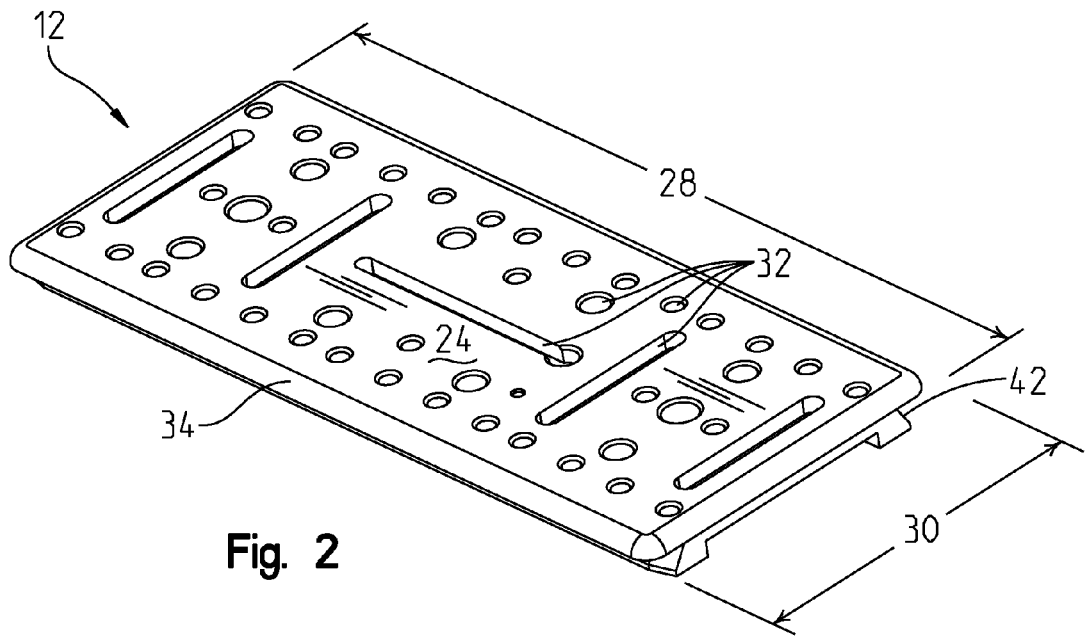
FIG. 2 is a perspective view of the top side of the plate.
Figure 3:
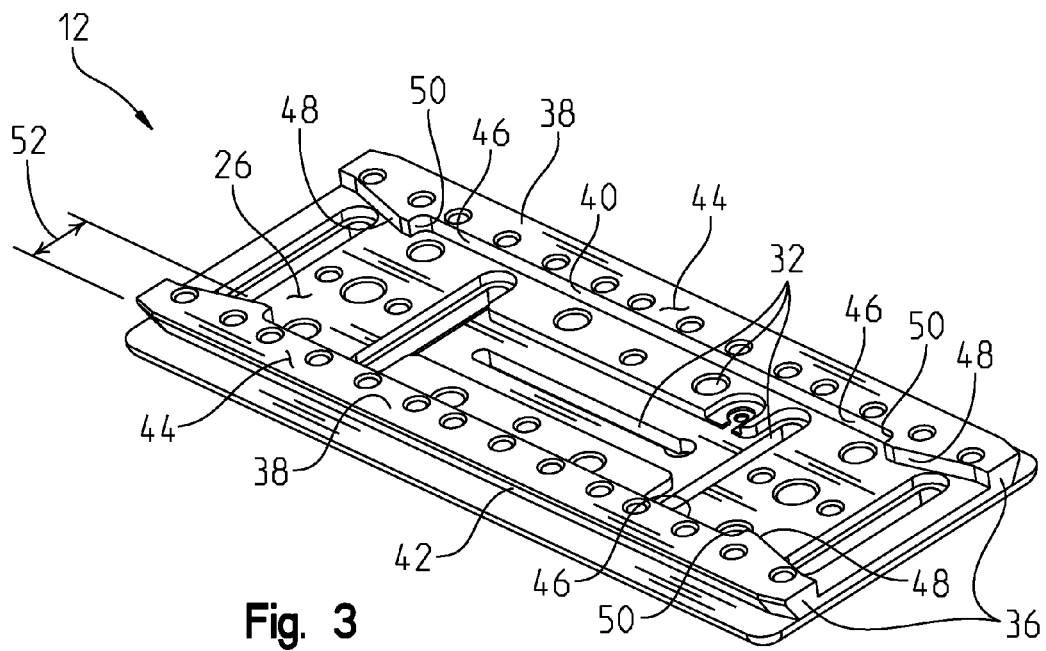
FIG. 3 is a perspective view of the bottom side of the plate.

Plate 12 is a generally rectangular plate having a top side 24, a bottom side 26, a length 28 and a width 30 as shown in FIGS. 2 and 3. Top side 24 of plate 12 is a generally flat surface which includes one or more plate apertures 32 piercing plate 12 and extending from top side 24 to bottom side 26. Apertures 32 are for attaching a device, such as a camera, to plate 12 and may be configured in a manner suitable for such attachment. In one embodiment, the perimeter of plate 12 includes a beveled edge 34. Bottom side 26 of plate 12 includes a tail 36 extending therefrom. Tail 36 is formed as a pair of opposing legs 38 which extend much of length 28 of plate 12. Each leg 38 extends proximate the perimeter edge of plate 12. Legs 38 are generally parallel with each other and parallel with length 28 of plate 12.

Each leg 38 includes an inner surface 40, a dovetailed surface 42, and a base 44 as shown in FIG. 3. The inner surface 40 of each leg 38 faces the inner surface of the opposing leg; likewise, dovetailed surface 42 of each leg 38 faces away from inner surface 40. Dovetailed surfaces 42 of each leg 38 together define tail 36 and are shaped to form a dovetailed-connection with socket 18. Inner surface 40 extends between a first flared section 48 and a second flared section 48 with a pathway 46 formed therebetween. Leg 38 has a thickness 52 defined as the distance between inner surface 40 and dovetailed surface 42. Pathway 46 is a generally linear portion of leg 38 having a generally constant thickness 52. Catch 50 is defined as a stepped-increase of thickness 52 between pathway 46 and flared section 48. Flared section 48 has a greater thickness 52 than pathway 46. In one embodiment, flared section 48 includes a tapered decrease in thickness 52 as spaced away from catch 50. Base 44 of leg 38 is a generally planar surface which forms a flat base surface for plate 12. Dovetailed surface 42 meets base 44 at edge 43. Edges 43 of legs 38 are spaced apart by a distance 91.

Figure 4:
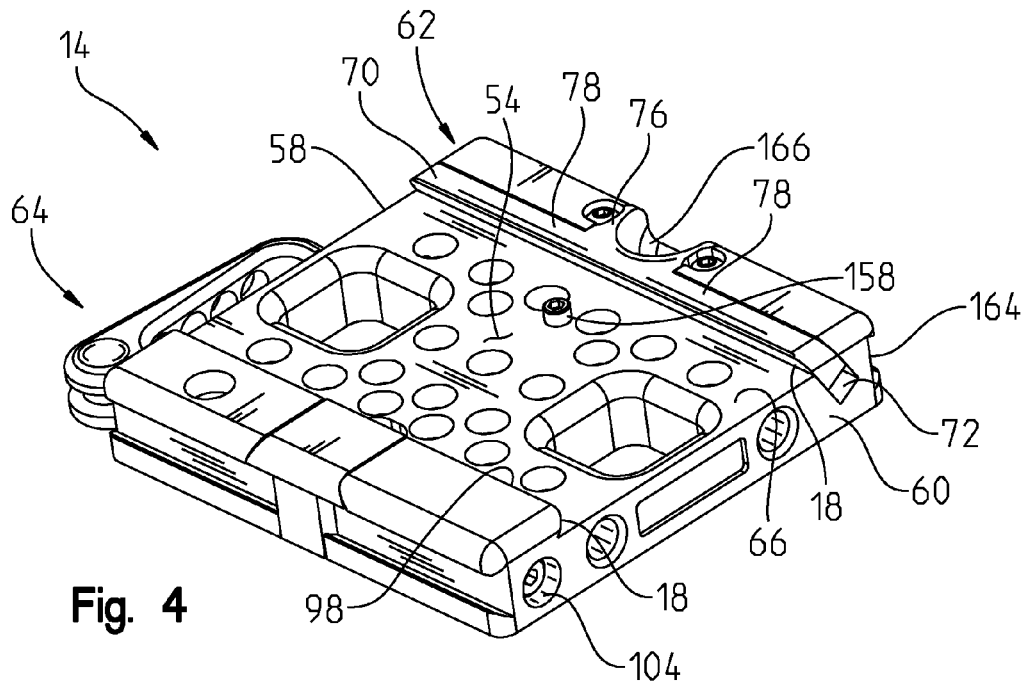
FIG. 4 is a perspective view of the top side of the base.
Figure 5:
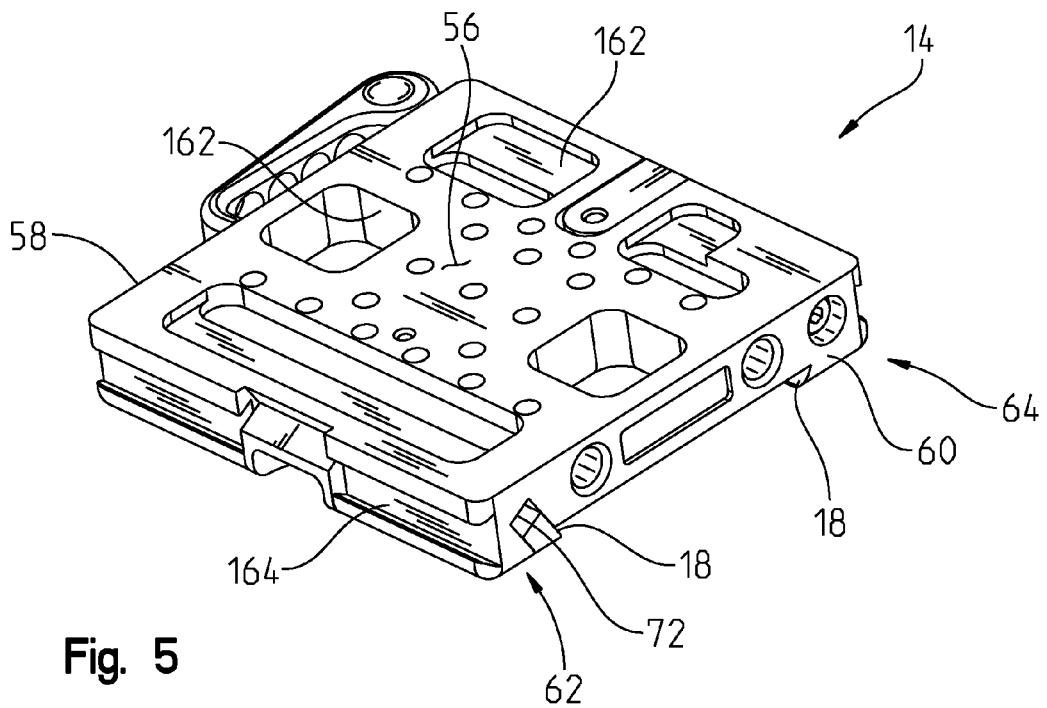
FIG. 5 is a perspective view of the bottom side of the base.

Referring now to FIGS. 4 and 5, base 14 is shaped generally as a rectangular block having a top side 54 and a bottom side 56 which are spaced apart by a perimeter edge surface defined by a first end 58, a second end 60, a gate side 62 and a clamp side 64. Top side 54 defines dovetailed socket 18 with one side of the socket formed by a dropping gate 70 and the other side of the socket formed by a clamp wall 98. A floor 66 spans top side 54 of base 14 between dropping gate 70 and clamp wall 98 and is defined as a planar surface upon which plate 12 is slidable when tail 36 is mated in socket 18. An opening 93, 96 is defined as the width of the opening of socket 18 (see FIGS. 7, 14 and 15). Opening 96 is the distance separating an inner edge 94 of dropping gate 70 and an inner edge 95 of clamp wall 98 as illustrated in FIG. 15. Opening 93 is the distance separating an inner edge 97 of gate side wall 68 and an inner edge 95 of clamp wall 98 as illustrated in FIG. 16.

Figure 6:
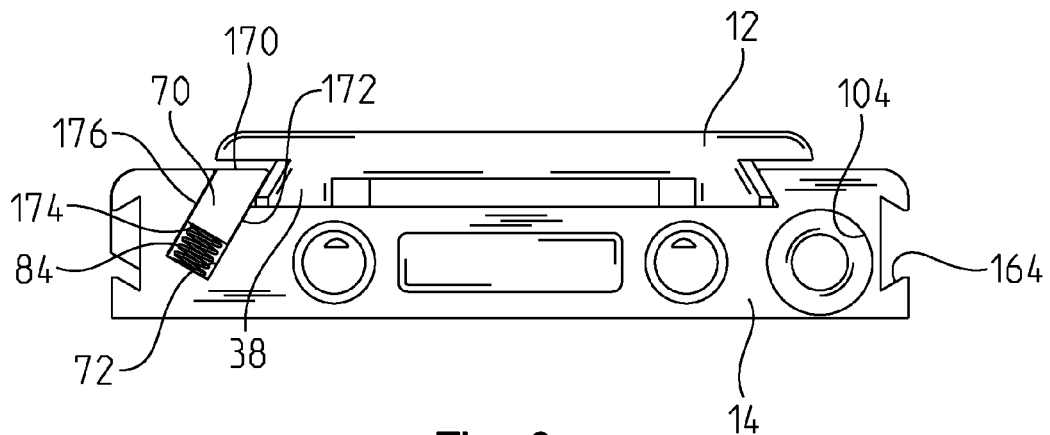
FIG. 6 is an end view of the plate seated on the base.
Figure 7:
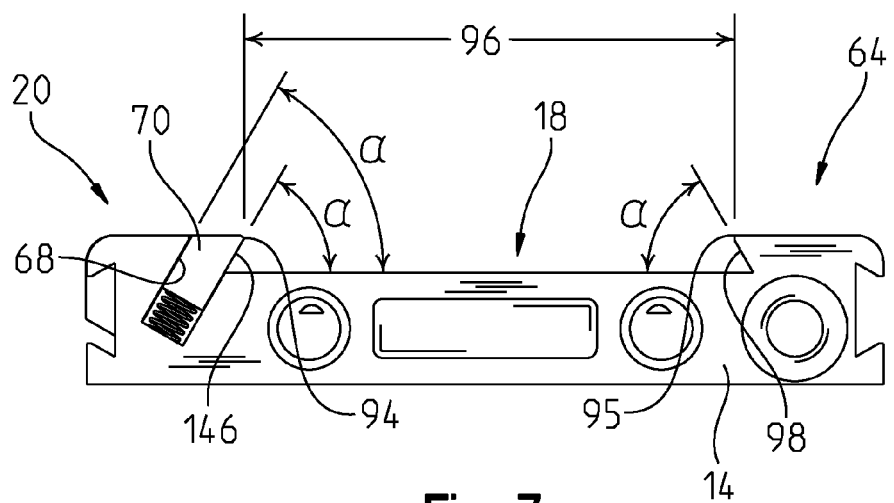
FIG. 7 is an end view of the base.
Figure 9:
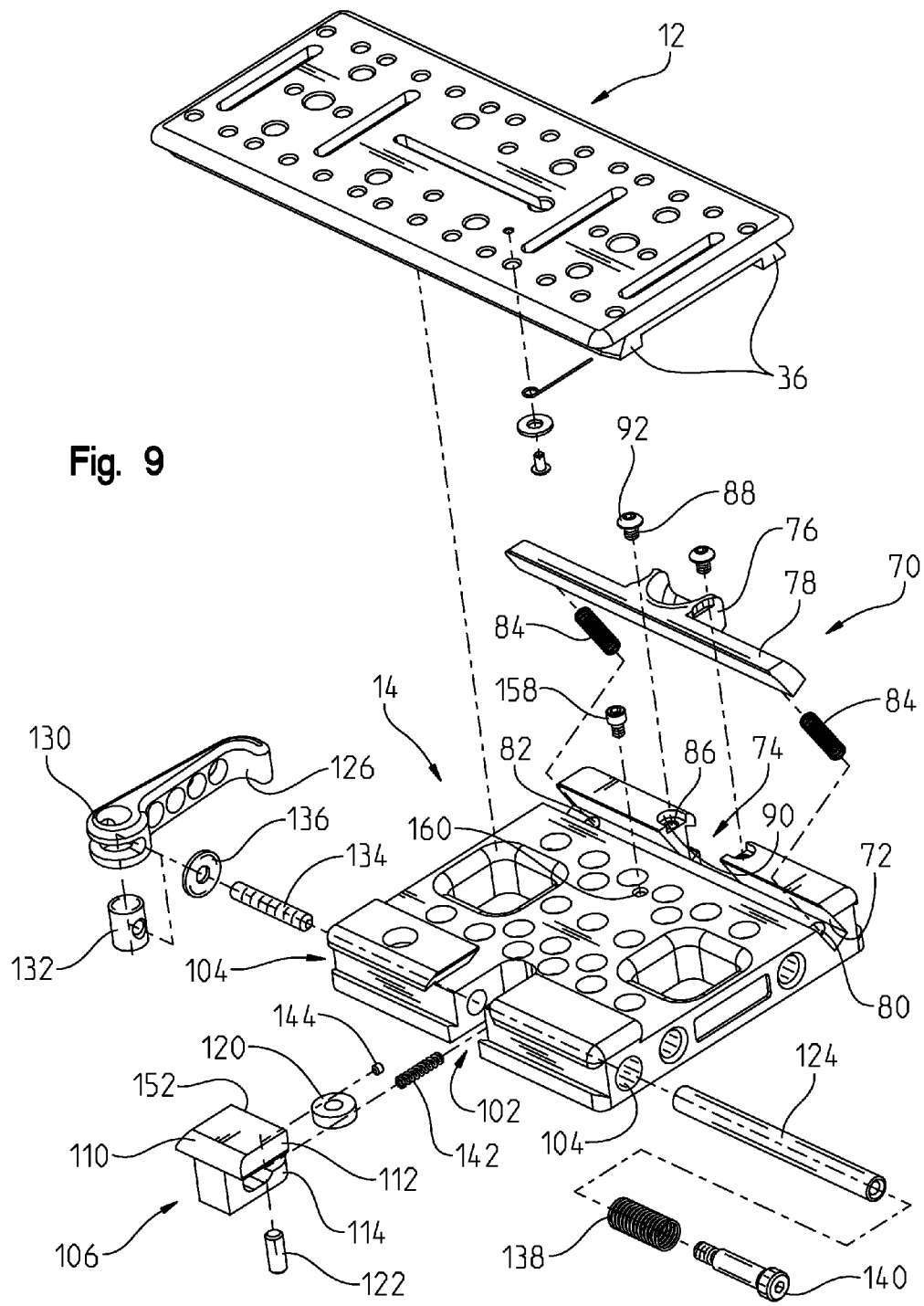
FIG. 9 is an exploded view showing the component parts of the base and the plate.

A compartment 72 is formed in base 14 beneath dropping gate 70. Compartment 72 is shaped to allow dropping gate 70 to recede into the compartment. Dropping gate 70 is generally T-shaped having a body 76 and arms 78 extending perpendicularly from the body, as shown in FIG. 9 and described in further detail below. In the preferred embodiment, arm 78 of dropping gate 70 has a cross-section shaped as a right trapezoid having a first side 170 which is generally parallel with floor 66, a second side 172 and a fourth side 176 which are parallel with one another, and a third side 174 which his perpendicular to both the second side and the fourth side, as shown in FIG. 6. Third side 174 faces compartment 72. When dropping gate 70 is in extended position 148 (defined below), a portion of second side 172 overlies tail 36. Inner edge 94 is defined as the edge formed between first side 170 and second side 172 (as shown in FIG. 7). Arm 78 of dropping gate 70 and compartment 72 are sized to nest together and to minimize slop therebetween. Second side 172 and fourth side 176 are parallel with one another and parallel with the path along which dropping gate 70 travels relative to compartment 72. As the dropping gate recedes arm 78 of dropping gate 70 fills compartment 72 with first side 170 substantially flush with floor 66, thereby the size of opening 96 increases to allow room for tail 36 to be vertically-inserted in socket 18.

Vertical insertion of plate 12 on base 14 is defined as insertion along a path perpendicular to a plane passing through both legs 38 of plate 12. Reference to vertical herein does not necessarily refer to a direction perpendicular to the ground where the mounting system is used, as base could be mounted in any spatial orientation and plate 12 can then be mounted vertically thereto, as opposed to laterally which is defined as a path parallel to a plane passing through legs 38.

Gate side wall 68 is spaced from floor 66 by compartment 72; compartment 72 is a trough formed between floor 66 and gate side wall 68, as shown in FIG. 7. Compartment 72 extends the length of floor 66 and is parallel to, and spaced inwardly from, gate side wall 68.

Figure 17:
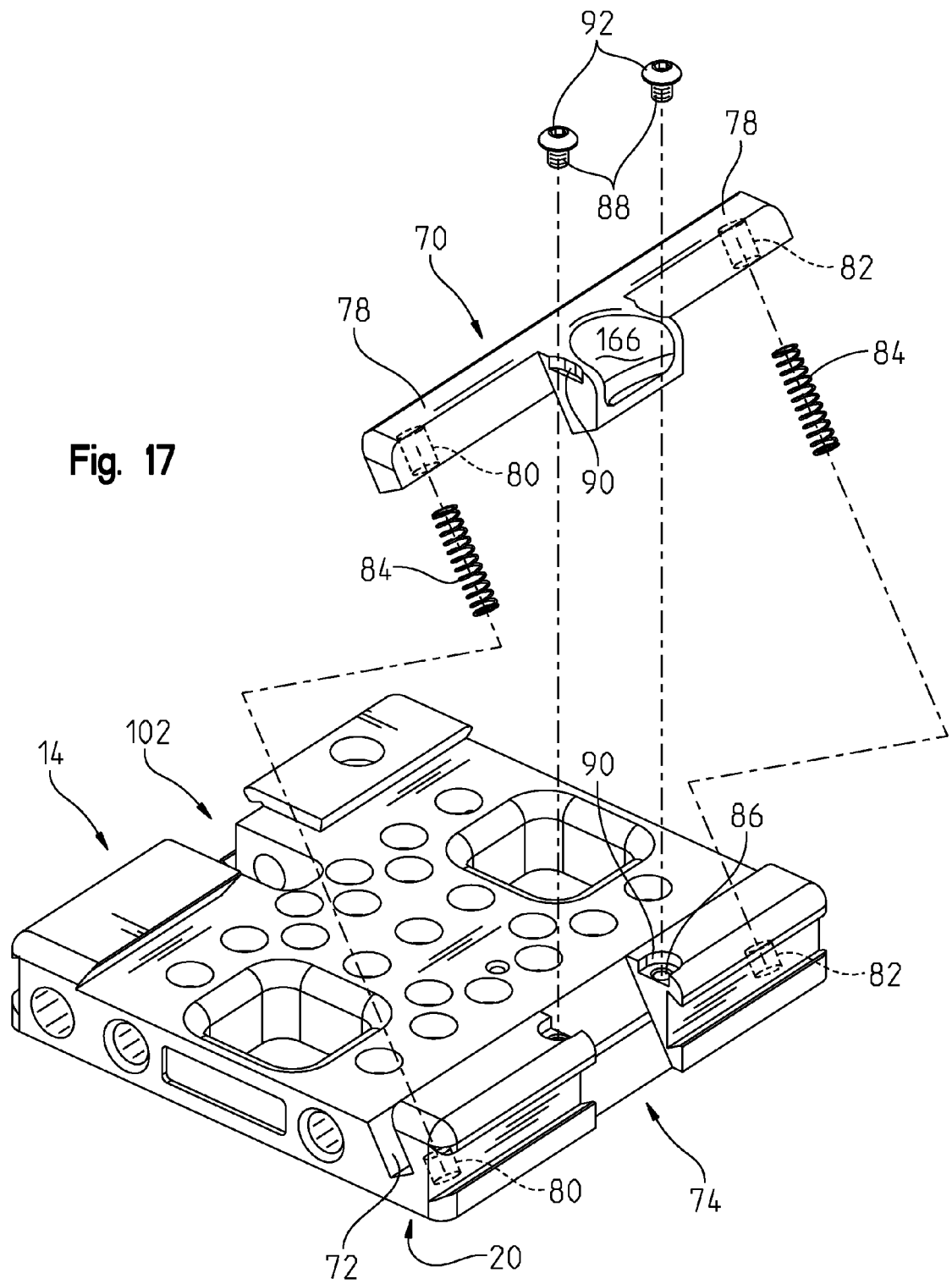
FIG. 17 is an exploded view of the base and the components of the dropping gate.

A cut-out 74 is formed as a gap in gate side 62 as shown in FIG. 9. Referring to FIGS. 9 and 17, dropping gate 70 is formed having a body 76 shaped to nest within cut-out 74. An arm 78 extends from body 76. Arm 78 extends parallel to gate side 62 and is sized to nest within compartment 72. Arm 78 includes second side 172 which forms one half of socket 18. Arm 78 and compartment 72 include spring bores 80, 82 positioned along a common axis and together house a spring 84. Spring 84 urges dropping gate 70 out of compartment 72. Dropping gate 70 biases between an extended position 148 and a recessed position 150. When in extended position 148 second side 174 partially extends over a portion of floor 66. When in recessed position 150, arm 78 is housed within compartment 72 with first side 170 substantially flush with floor 66. In one embodiment, body 76 includes a depression 166 which serves as a tactile reference to indicate where to push on body 76 to move dropping gate 70 to recessed position 150 to either insert or remove plate 12 from base 14.

Figure 8:
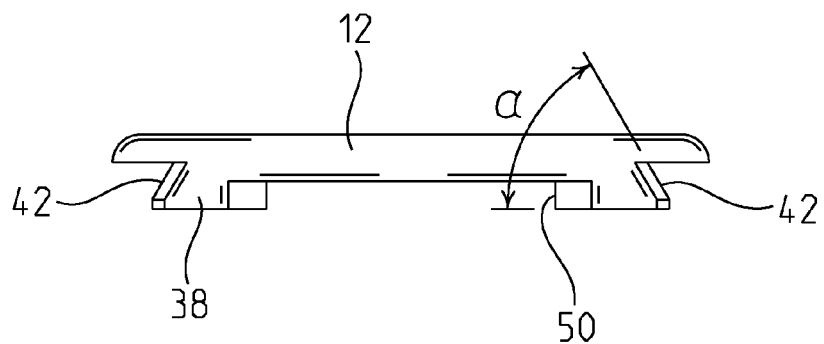
FIG. 8 is an end view of the plate.

Referring to FIGS. 7 and 8 tail 36 and socket 18 are defined by angle α which is formed between floor 66 and each of dovetailed surface 42 of tail 36, second side 172 and fourth side 176 of dropping gate 70, compartment 72, gate sidewall 68 or clamp wall 98. Both tail 36 and socket 18 are defined by angle α, so that they mate together in a dovetailed-relationship. Dropping gate 70 drops into compartment 72 along a path defined by a plane parallel to second side 172, with compartment 72 cut in base 14 along such plane, such that as the dropping gate recedes into the compartment the inner edge 94 of dropping gate 70 moves away from clamp wall 98—thereby opening 96 between the dropping gate and the clamp wall 98 increases as the dropping gate recedes into the compartment toward recessed position 150.

A bore 86 is formed in top side 54 of gate side 62 of base 14 adjacent cut-out 74 for accepting a fastener 88 as shown in FIG. 9. In one embodiment a counter-bore 90 is formed around bore 86, with a portion of counter-bore 90 formed on body 76 of dropping gate 70. Fastener 88 includes a head 92 which partially overlaps body 76 thereby preventing spring 84 from urging dropping gate 70 beyond head 92; thereby, the travel of dropping gate 70 is restricted on one end by the depth of compartment 72 (or alternatively, the maximum compression of spring 84) and on the other end by head 92.

Dropping gate 70 drops into compartment 72 when a force great enough to compress spring 84 is exerted on body 76 and/or arm 78 as shown in FIG. 16. Plate 12 is inserted on base 14 by lowering plate 12 toward base 14 until tail 36 contacts dropping gate 70. Tail 36 is then pressed against dropping gate 70 which causes the gate to lower into compartment 72. With dropping gate 70 retracted into compartment 72 opening 93 is sized to accept tail 36 into socket 18 whereby base 44 of tail 36 rests flush with floor 66 and the dropping gate is then free to spring back against fastener 88 (see FIGS. 14 and 15). Thereby plate 12 is held against base 14 by dropping gate 70 overlying tail 36.

Figure 14:
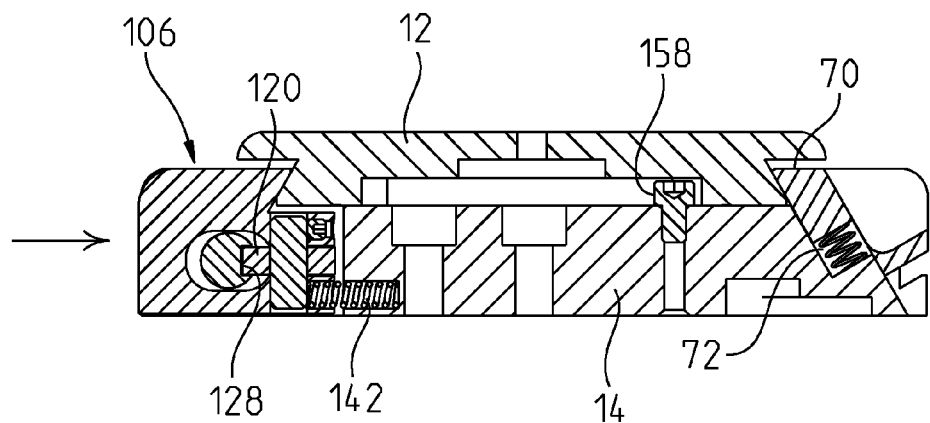
FIG. 14 is a cross-sectional end view of the plate and base showing the clamp assembly in the locked position and the dropping gate in the extended position.
Figure 15:
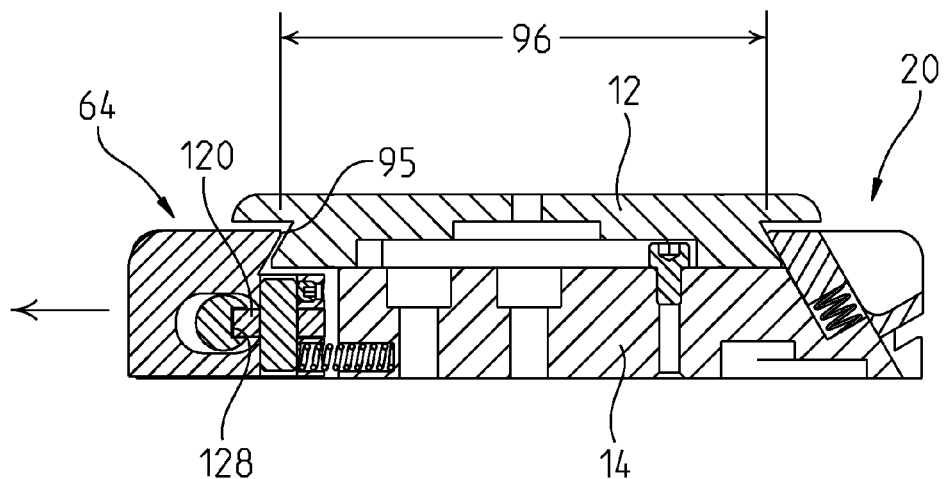
FIG. 15 is a cross-sectional end view of the plate and base showing the clamp assembly in the unlocked position and the dropping gate in the extended position.
Figure 16:
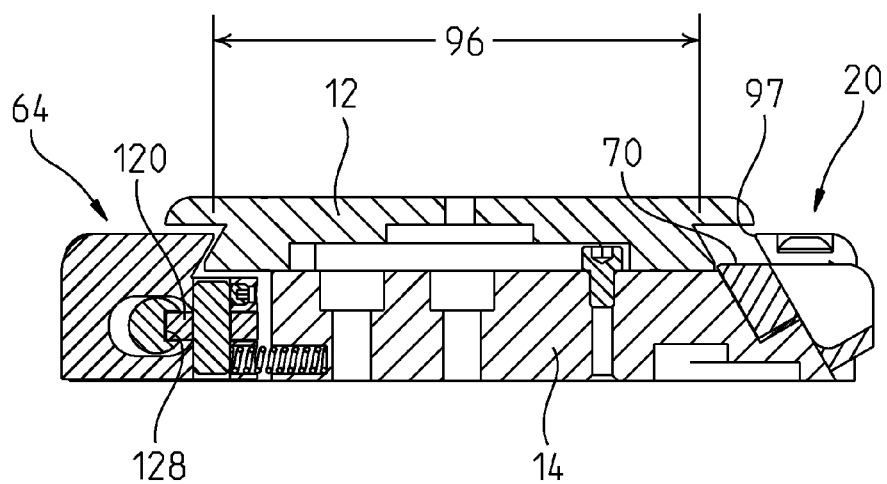
FIG. 16 is a cross-sectional end view of the plate and base showing the clamp assembly in the unlocked position and the dropping gate in the recessed position.

With plate 12 installed on base 14, dropping gate 70 overlies tail 36, as shown in FIGS. 14 and 15. Dropping gate 70 forms half of socket 18 (the other half of socket 18 being formed by clamp wall 98), such that tail 36 and socket 18 form a restrictive fit that limits movement of plate 12 relative to base 14 to linear movement along a line parallel with legs 38 of plate 12. Such lateral movement can be restricted by use of a clamp assembly 100, as described in greater detail below, which holds plate 12 in a fixed position relative to base 14.

Clamp side 64 of base 14 includes clamp wall 98 and clamp assembly 100. Clamp wall 98 is an upwardly extending tapered wall extending from floor 66 which forms half of socket 18, with the other half formed by dropping gate 70. Clamp wall 98 includes a cut-out 102 separating the clamp wall into two sections (as shown in FIG. 9). A clamp bore 104 passes through base 14 adjacent to, and parallel with, clamp wall 98. Clamp bore 104 accepts a clamp assembly 100 which serves to restrictively hold plate 12 to base 14, as described in further detail below.

Figure 10:
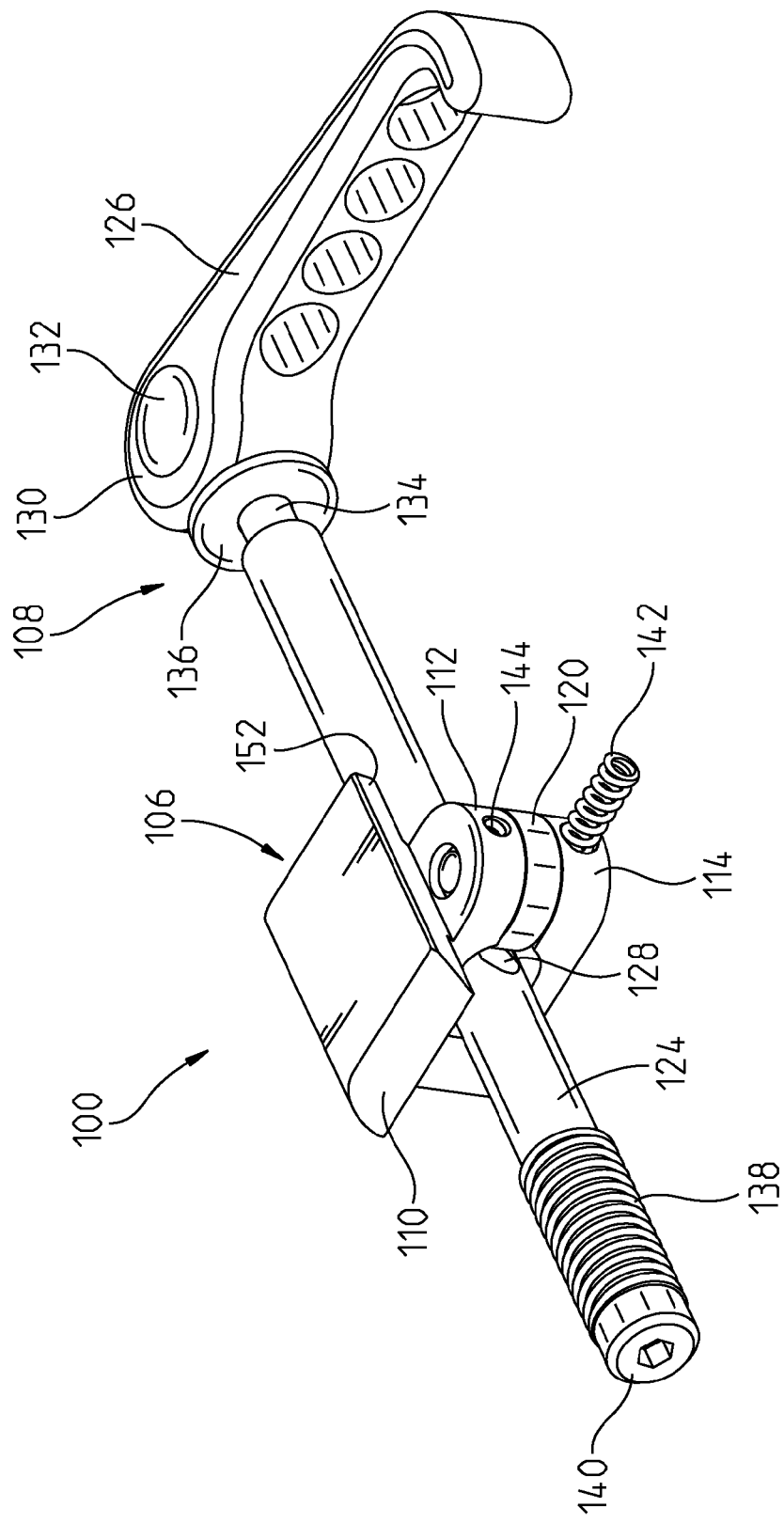
FIG. 10 is a perspective view of the clamp assembly as removed from the base.
Figure 11:
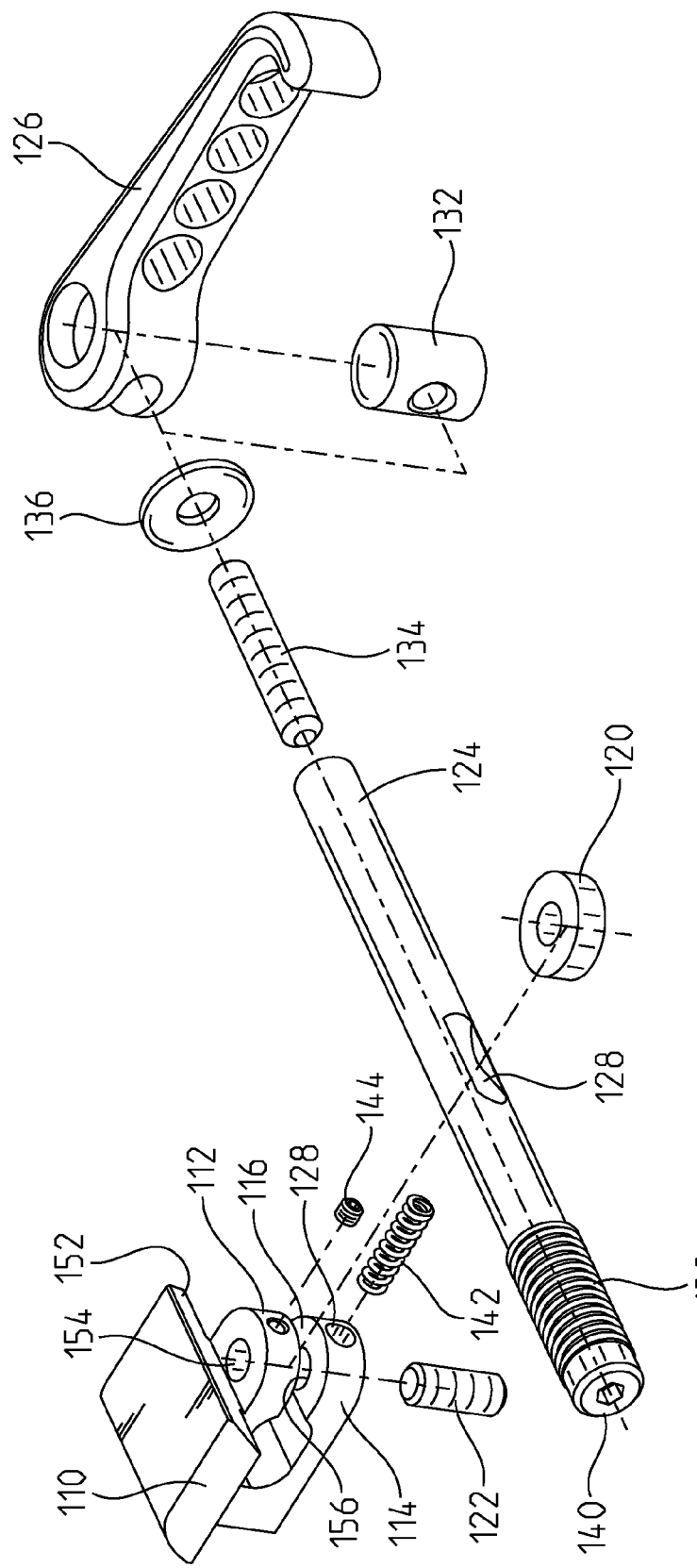
FIG. 11 is an exploded view of the clamp assembly of FIG. 10.
Figure 12:
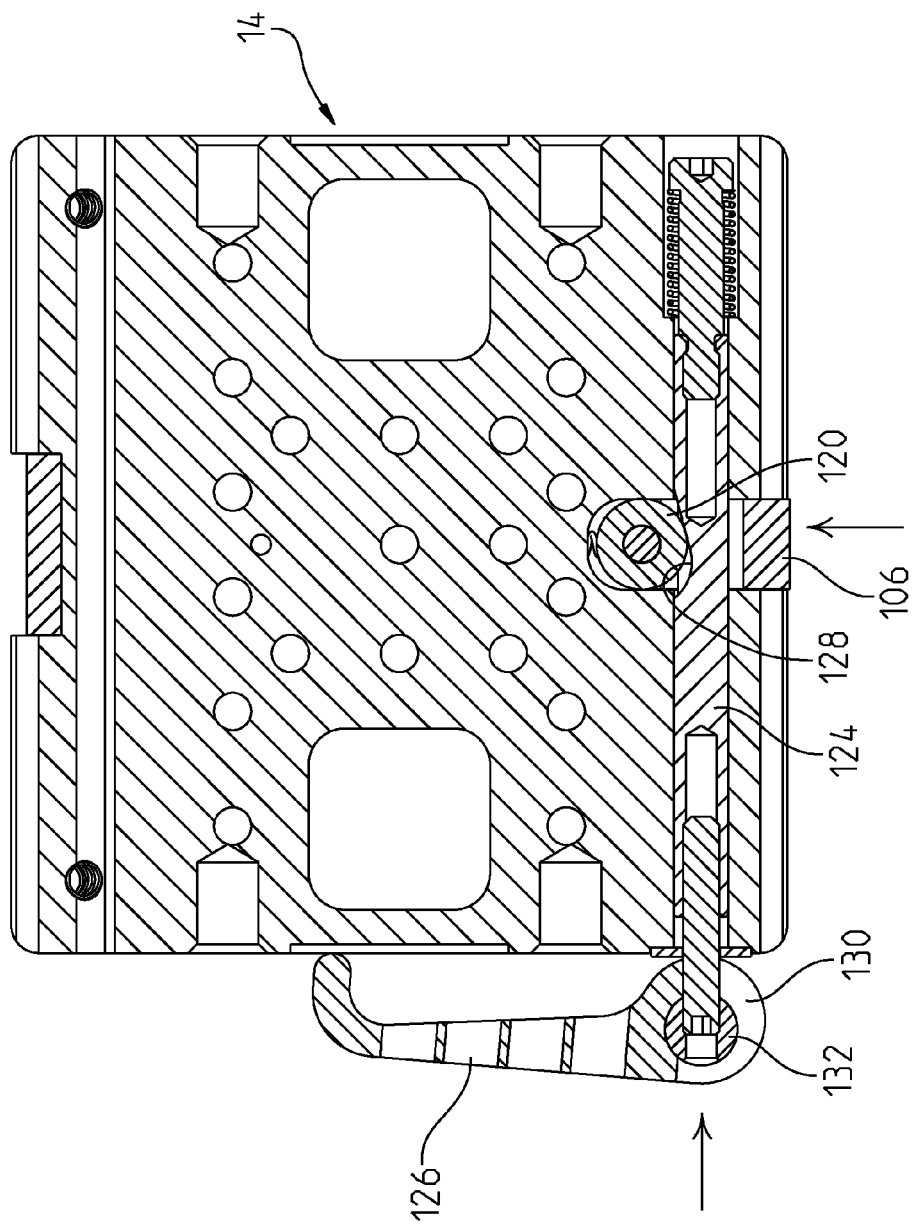
FIG. 12 is a cross-sectional top view of the base showing the clamp assembly in the locked position.
Figure 13:
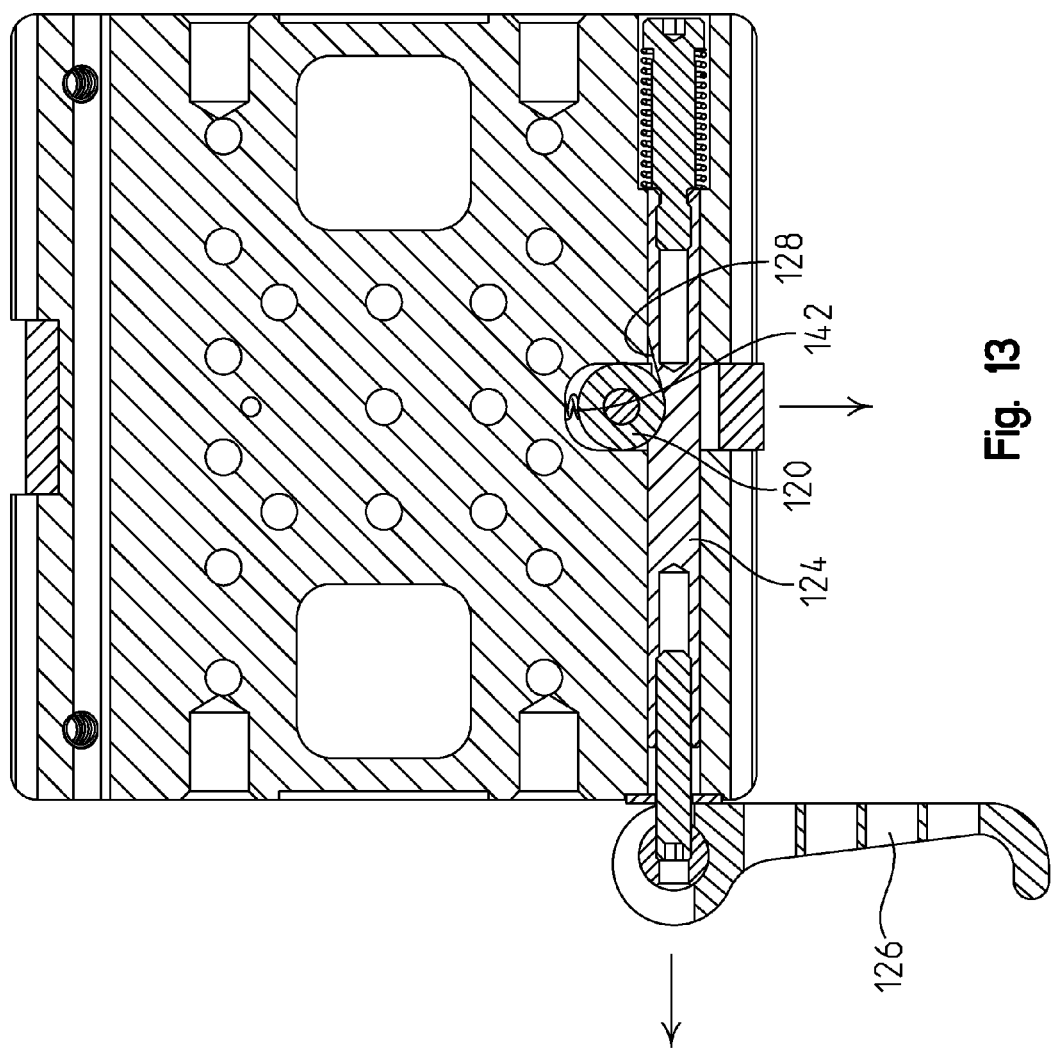
FIG. 13 is a cross-sectional top view of the base showing the clamp assembly in the unlocked position.

Referring now to FIGS. 10 and 11, clamp assembly 100 includes a clamp body 106 and a cam assembly 108 which together form a clamp which may be tightened to restrict movement of plate 12 relative to body 14. Clamp body 106 includes a tapered crown 110 sized to fit in cut-out 102. Clamp body 106 includes a C-shaped extension extending from the crown which is composed of an upper support 112 and a lower support 114 which a gap 116 formed therebetween. A pair of aligned bores 154, 156 pass through supports 112, 114 and are sized to accept a pin 122. Gap 116 is sized to accept a ring 120 which is held in gap 116 of clamp body 106 by pin 122 which is secured in bores 154, 156. Additionally, a set screw 144 forms a friction fit between pin 122 and tipper support 112 to retain the pin in clamp body 106. In one embodiment, clamp body 106 and cut-out 102 mate together in a dovetailed-relationship so as to limit the movement of the clamp body relative to base 14 to lateral motion along an axis passing through cut-out 102 and cut-out 74 of gate side 62. Clamp body 106 includes a dovetailed face 152 which forms a portion of socket 18 and is biased against plate 12 by clamp assembly 100.

Clamp assembly 108 includes a shaft 124 carried in clamp bore 104. Clamp assembly 108 has an indentation, or wedge 128, formed as a sloped, recessed surface in an intermediate portion of shaft 124. Ring 120 is seated against wedge 128. Wedge 128 has a sloped surface, such that as shaft 124 moves axially, ring 120 is urged radially relative to the shaft thereby moving clamp body 106 radially, wherein this radial movement is along a path perpendicular to clamp wall 98. In this way, axial movement of shaft 124 is transformed through wedge 128 to radial motion of clamp body 106. Shaft 124 is joined to a clamp arm 126 such that as the clamp arm is articulated about a pin 132 the shaft moves axially. Clamp arm 126 is preferably proximate first end 58 of base 14, though this orientation may vary within the scope of this disclosure. Clamp arm 126 includes a cammed-wall 130 having a varying-diameter such that as the clamp arm is articulated about pin 132, shaft 124 is drawn toward or away from the clamp arm. Pin 132 is connected to shaft 124, such as by a connecting rod 134, with a washer 136 spaced between clamp arm 126 and base 14 along a lateral path. Articulation of clamp arm 126 is translated to axial movement of shaft 124. In one embodiment shaft 124 includes a spring 138 which urges shaft 124 against clamp arm 126 to aid moving the shaft in the direction of the clamp arm. In another embodiment, shaft 124 includes a bolt 140 for adjusting the tightness of the clamp by varying the axial position of shaft 124 in clamp bore 104. Where present, bolt 140 and spring 138 are positioned at the opposite end of shaft 124 from clamp arm 126. In a further embodiment a spring 142 is positioned between clamp body 106 and base 14 to urge the clamp body away from base 14.

Referring now to FIGS. 18A and 18B, a stop 158 is seated in a bore 160 formed in floor 66 of base 14. Stop 158 extends from floor 66 such that when plate 12 is seated on base 14, stop 158 is proximate inner surface 40 of one of legs 38. Stop 158 is fixed to base 14, such that it does not retract or otherwise recede into floor 66—once seated in bore 160, stop 158 is immovable within bore 160 in the normal operation of the base and plate. Legs 38 are generally symmetrical such that plate 12 may be seated on base 14 with either leg 38 proximate stop 158, allowing for flexibility in mounting a camera to the plate, and the plate to the base. Plate 12 is slidable on base 14 along a linear path, when clamp assembly 100 is not in restrictive contact with the plate, wherein the plate is freely slidable when stop is proximate pathway 46, such linear movement is restricted by stop contacting catch 50. Thereby, catch 50 limits the linear travel of plate 12 relative base 14. The use of stop 158 and catch 50 represents a significant improvement over the prior art. In prior art quick-release camera mounts, once the plate is mounted in the dovetailed-base, the plate is freely slidable until a clamping mechanism is locked. In such instances, if the base is mounted vertically or on an incline, the plate would be free to slide off the base if the clamp fails or is not engaged. In the present disclosure, stop 158 and catch 50 are safety devices which prevent plate 12 sliding off of base 14. Such a fixed stop 158 would be incompatible with prior art, lateral insertion, camera mounts since the stop would prevent insertion and removal of the plate from the base. The reason for this failure is that catch 50 on plate 12 of the present disclosure inhibits both lateral insertion and removal of the plate from base 14 as both catch 50 and stop 158 are non-retractable—meaning that there is no mechanical mechanism which allows one or both of the catch or stop to move to allow lateral insertion or removal of plate 12 from base 14—such a design is a built-in safety feature to prevent plate 12 from inadvertently sliding off of base 14.

Together, vertical insertion, and the catch/stop overcome the primary failings of the prior art. First, vertical loading allows plate 12 to be inserted on base 14 even when an object mounted on plate 12 includes objects which overhang the plate and would prevent lateral insertion. Second, the catch/stop serve as a safety device to prevent plate 12 from sliding linearly off of base 14.

In one embodiment a weight reducing carve out 162 is formed in base 14. Carve out 162 is included where a lightweight base is desired. In another embodiment a lateral socket 164 is formed in the outer perimeter of base 14. Socket 164 is adapted for accepting a tail of an accessory for mounting to base 14.

This invention is not limited to the details above, but may be modified within the scope of the following claims.

What is claimed is:
1. A mount comprising:
a plate having a tail;
a base having a socket, said socket defined by a floor a dropping gate and a clamp wall, said dropping gate having a body and arms extending perpendicularly from said body, each arm having a first side being substantially parallel to said floor of said socket, a second side facing said socket and forming a portion of said socket, a third side substantially parallel to said first side, and a fourth side substantially parallel to said first side, said dropping gate is movable between an extended position and a recessed position, said recessed position defined as said dropping gate nested within a compartment formed in said base wherein said dropping gate first wall is recessed at least to said floor, said base including a cutout through said base, said cutout extending beyond said compartment, said body being slidably retained in said cutout for facilitating movement of said dropping gate from its extended position into its recessed position, said tail forming a dovetailed-fit in said socket; and
a clamp apparatus is defined by a clamp body and a shaft, the clamp body biases between a clamped position and an unclamped position, a portion of said clamp wall is defined by a face of said clamp body, a ring is carried by said clamp body, said shaft is housed within a clamp bore formed in said base, said shaft includes a wedge cutout formed in an outer surface of said shaft, said ring makes camming contact with said wedge, thereby axial movement of said shaft biases said clamp body between said clamped and said unclamped position.

2. The mount of claim 1, and said tail formed from a first leg and a second leg.

3. The mount of claim 2, wherein said dovetailed-fit between said socket and said tail restricts movement between said plate and said base to movement along a single axis, said axis parallel with said clamp wall inner edge and said dropping gate inner edge.

4. The mount of claim 3, and said base including a fixed stop extending from said floor.

5. The mount of claim 4, wherein said first leg includes a pathway, said pathway is a substantially linear portion of said leg and parallel to said axis, said pathway adjacent said stop.

6. The mount of claim 5, wherein said pathway terminates in a catch, said catch extending generally perpendicularly from said pathway.

7. The mount of claim 6, wherein said catch engages said stop to prevent said plate from movement along said axis beyond said stop.

* * * * *